Sept. 6, 1932.  A. J. MILLER, JR  1,876,430
VEHICLE WINDOW SHADE
Filed Nov. 6, 1931
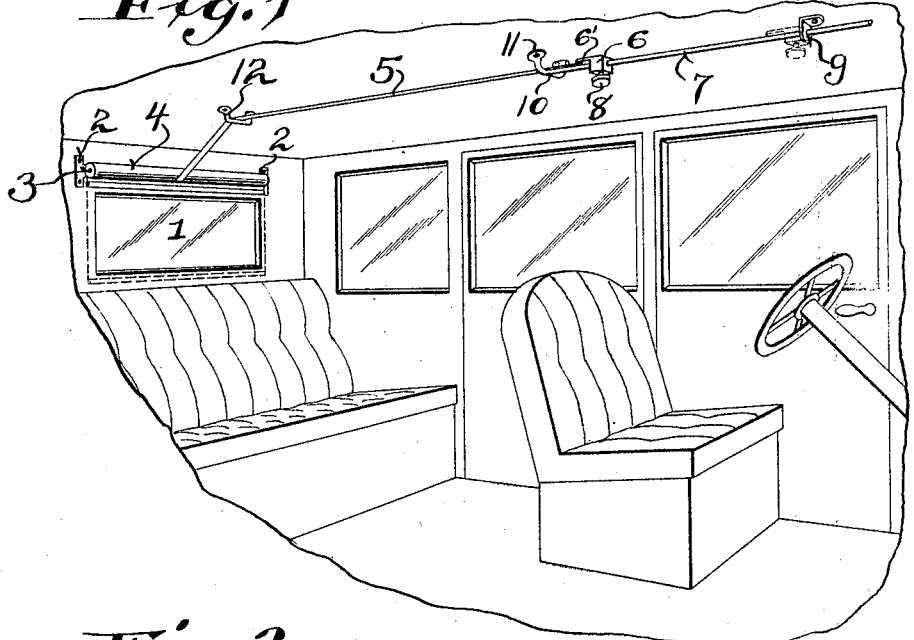
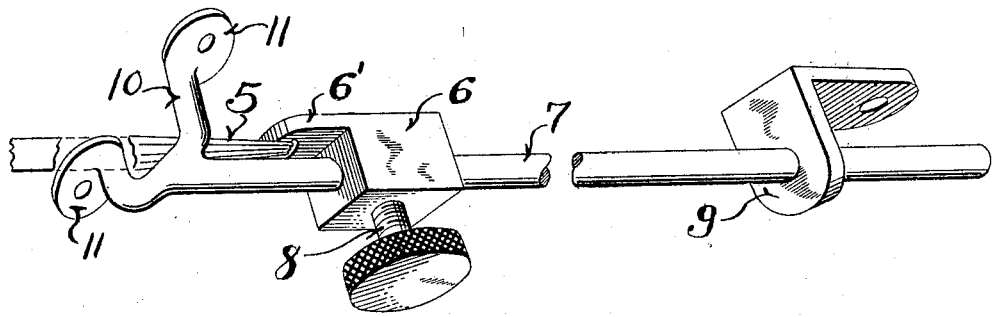
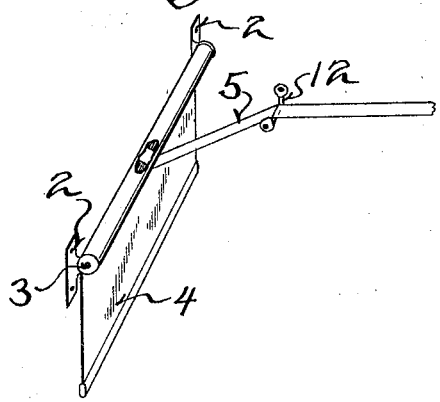
INVENTOR.
Alfred J. Miller Jr.
BY
ATTORNEY.

Patented Sept. 6, 1932

1,876,430

UNITED STATES PATENT OFFICE

ALFRED J. MILLER, JR., OF NEWARK, NEW JERSEY

VEHICLE WINDOW SHADE

Application filed November 6, 1931. Serial No. 573,360.

My invention refers to vehicle window shades and has for its primary object to provide means for controlling the position of the rear window shade of an automobile from the driver's seat.

Practice has demonstrated that the driver depends largely upon the mirror-reflected view through the rear window of a car for guidance in traffic back of the same.

In night driving the vision is frequently blinded by the glare of headlights entering through the rear window. In such emergencies under ordinary conditions it becomes necessary to either awkwardly shift position from the front of the car to the rear in order to raise or lower the shade, or to request an occupant of the rear seat to do so in order to eliminate the obstructing rear glare. This condition arises frequently in driving when it is desired to quickly raise or lower the rear curtain. Hence, the manipulation of the rear curtain instantly from the front or driver's seat without change of position results frequently in avoiding serious accidents.

With this object in view, my invention contemplates the application of a simple, durable and inexpensive means for instantly controlling the position of the curtain from the front of the vehicle, or driver's seat.

The specific object of my invention is to provide a flexible runner or tape which is secured to a standard spring-actuated roller and adapted to be wound or rewound on the same with the curtain, the runner being extended forward and terminating at an accessible position for manipulation by the driver, whereby the curtain is raised or lowered instantly.

Means is also provided for securing the runner against tension of the roller rewinding spring when the curtain is manually dropped to closed position through action of said runner in rotating said roller.

With the above and other objects in view, my invention consists in certain peculiarities of construction and combination of parts, as will be hereinafter fully set forth with reference to the accompanying drawing and subsequently claimed.

In the drawing, Figure 1 represents a perspective view of a fragmentary portion of an automobile provided with a rear curtained window having attached thereto a curtain manipulating runner embodying the features of my invention;

Figure 2 is an enlarged fragmentary perspective view illustrating the front end of the runner together with means for locking the same in predetermined position and locking means for guiding said runners; and Figure 3 is a perspective view of a standard spring-controlled roller having a runner or tape attached thereto, together with a shade and guide means for said tape.

Referring by character to the drawing, 1 represents the rear window of a vehicle having fitted thereto bearing brackets 2—2 for the reception of the journals of a standard spring-controlled roller 3 commonly known as the Hartsarn type. This roller has secured thereto a standard curtain or shade 4, and it also has secured to it, the end of a flexible runner or tape 5, as best shown in Figure 3.

In this view, the shade is illustrated as in its dropped position, whereby view through the window 1 is obstructed and said roller is held against its spring tendency to rewind by a locking means located at the front or near the driver's seat.

The locking means shown comprises a block 6 which is slidably mounted upon a guide rod 7 and the front end of the tape 5 is secured to an ear 6' that extends from the block 6. This block is also provided with a threaded aperture for the reception of the threaded stem of a locking screw 8, which screw is provided with a knurled head, as shown.

The front end of the guide rod is secured to the roof of the car by a bracket 9, the same being provided with an apertured ear for permanent attachment to the ceiling or roof of the car, as best shown in Figure 1.

The rear end of the guide rod 7 terminates in a yoke 10 provided with apertured feet 11 for attachment to the top of the vehicle, as shown. This, of course, serves as a guide for the forward end of the tape, whereby it is held in close relation to the top surface of the car body or ceiling, and said tape is also guided and held in its desired position by a rear positioned loop 12. This loop also terminates in apertured feet for securing it to the car ceiling.

Hence, the manipulating parts are all positioned closely to the ceiling whereby they will not form any obstruction and, furthermore, these parts will be so finished as to be inconspicuous. Thus, it is obvious also that the tape might be extended through the finishing fabric of the ceiling in place of being exposed, as shown.

It is obvious that when the curtain or shade is up to expose the rear window, as shown in Figure 1 of the drawing, and it is desired to drop the shade, whereby reflections from the rear are eliminated, the driver or operator from the front of the vehicle simply rotates the locking screw to relieve it from frictionally engaging with the rod 7, and thereafter moves the head block forward upon said rod.

Thus, the roller or tape is drawn forward and owing to the fact that it is coiled above the roller with the curtain, it will in its forward movement rotate the roller against its spring pressure, causing the shade or curtain to drop over the window.

The locking screw 8 is then twisted slightly so as to cause it to impinge against the guide rod and lock the moved parts in this position, as indicated in dotted lines in Figure 1 of the drawing.

It is apparent that when the curtain is rolled to expose the rear window, the locking screw may or may not be locked in conjunction with the rod due to the fact that the spring has entirely rewound the shade by this locking function, but it may be used to prevent rattling.

It is understood that I may use any type of locking means, such, for example, as the friction lock or spring snap, operating in conjunction with the rod.

While I have shown and described one convenient means of carrying out my invention, it is understood that I may vary the same to accomplish the desired result within the knowledge of skilled mechanics.

In certain localities where the rules prohibit the entire shading of the rear window, the clip 9 may be moved rearwardly a sufficient distance so that when the head block is pulled forward it will only permit the shade to be partially lowered a predetermined distance so as to obscure light from the rear.

I claim:

In a vehicle having a rear window and a spring controlled shade roller, the combination of a device for controlling said shade roller from the front portion of the vehicle comprising a flexible tape having one end secured to the roller, whereby it is wound thereon in conjunction with the shade on the roller, a longitudinally extending guide rod, a U-shaped guide on the rear end of said rod, means securing the terminals of the U-shaped guide to the ceiling of the body of the vehicle for supporting the rear end of the rod, means supporting the front end of the rod from the ceiling, a slide block adjustably mounted on the guide rod, said tape being received in the U-shaped guide and supported thereby, and means securing the forward end of the tape to the slide block.

In testimony that I claim the foregoing I have hereunto set my hand at Newark, in the county of Essex and State of New Jersey.

ALFRED J. MILLER, Jr.